United States Patent
Park et al.

(10) Patent No.: US 10,234,621 B2
(45) Date of Patent: Mar. 19, 2019

(54) DISPLAY DEVICE

(71) Applicant: Samsung Display Co., Ltd., Yongin-Si, Gyeonggi-Do (KR)

(72) Inventors: Chan-jae Park, Osan-si (KR); Hyun-hwa Song, Hwaseong-si (KR); Seunghwan Baek, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 65 days.

(21) Appl. No.: 15/158,116

(22) Filed: May 18, 2016

(65) Prior Publication Data

US 2017/0059766 A1  Mar. 2, 2017

(30) Foreign Application Priority Data

Aug. 27, 2015  (KR) .......................... 10-2015-0121058

(51) Int. Cl.
*F21V 7/04* (2006.01)
*F21V 8/00* (2006.01)

(52) U.S. Cl.
CPC ........... *G02B 6/0076* (2013.01); *G02B 6/002* (2013.01); *G02B 6/0068* (2013.01)

(58) Field of Classification Search
CPC .... G02B 6/0076; G02B 6/002; G02B 6/0051; G02B 6/0055; G02B 6/0068; G02B 6/0088; G02F 1/133308; G02F 2001/133314; G02F 2001/13332; G02F 2001/133342
USPC ......................................................... 362/607
See application file for complete search history.

(56) References Cited

U.S. PATENT DOCUMENTS

| | | | | |
|---|---|---|---|---|
| 6,871,975 B2* | 3/2005 | Chuang | ................ | G02B 6/0046 362/23.1 |
| 6,986,598 B2* | 1/2006 | Chu | ..................... | G02B 6/0068 345/1.1 |
| 8,651,725 B2* | 2/2014 | Ie | .......................... | G02B 6/0045 362/607 |
| 9,743,486 B2* | 8/2017 | Chuang | ................. | H05B 37/02 |
| 2005/0052383 A1 | 3/2005 | Suzuki | | |
| 2007/0139966 A1* | 6/2007 | Kim | ..................... | G02B 6/0055 362/616 |
| 2011/0242837 A1* | 10/2011 | Cornelissen | ........... | G02B 6/002 362/555 |

(Continued)

FOREIGN PATENT DOCUMENTS

JP  2012169245 A  9/2012
JP  2012234765 A  11/2012

(Continued)

*Primary Examiner* — Anh T Mai
*Assistant Examiner* — Matthew J. Peerce
(74) *Attorney, Agent, or Firm* — Cantor Colburn LLP

(57) ABSTRACT

A display device includes a first display panel including a display surface defined by first and second directions, a second display panel spaced apart from the first display panel in a third direction perpendicular to the display surface, and a backlight unit disposed between the first and second display panels to provide a light to the first and second display panels. The backlight unit includes a light emitting element, a first exit light guide plate, a second exit light guide plate spaced apart from the first exit light guide plate, a first light-division light guide member, and a second light-division light guide member.

19 Claims, 11 Drawing Sheets

(56) References Cited

U.S. PATENT DOCUMENTS

| | | | | |
|---|---|---|---|---|
| 2012/0169967 | A1* | 7/2012 | Han | G02F 1/1333 |
| | | | | 349/62 |
| 2013/0076249 | A1* | 3/2013 | Chuang | H05B 37/02 |
| | | | | 315/152 |
| 2013/0300982 | A1* | 11/2013 | Tanaka | G02B 6/0046 |
| | | | | 349/65 |
| 2015/0036319 | A1* | 2/2015 | Ning | G02F 1/133608 |
| | | | | 362/97.1 |
| 2015/0219836 | A1* | 8/2015 | York | G02B 6/0006 |
| | | | | 349/65 |

FOREIGN PATENT DOCUMENTS

| | | |
|---|---|---|
| KR | 1020030073573 A | 9/2003 |
| KR | 1020050121459 A | 12/2005 |
| KR | 1020070040509 A | 4/2007 |
| KR | 100927015 B1 | 11/2009 |
| KR | 1020110077333 A | 7/2011 |
| KR | 101315983 B1 | 10/2013 |
| KR | 101343118 B1 | 12/2013 |
| KR | 1020140060140 A | 5/2014 |

\* cited by examiner

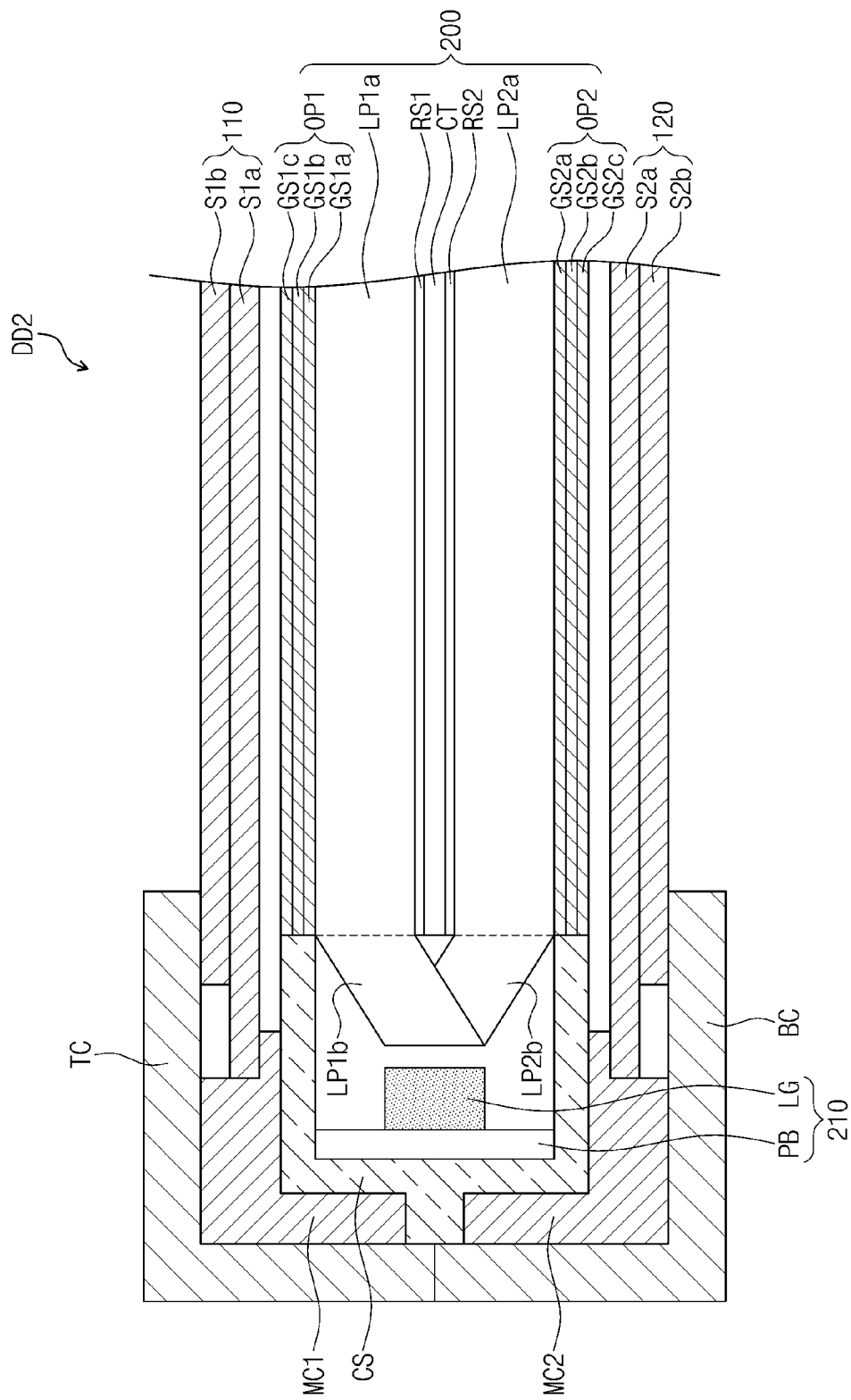

DISPLAY DEVICE

This application claims priority to Korean Patent Application No. 10-2015-0121058, filed on Aug. 27, 2015, and all the benefits accruing therefrom under 35 U.S.C. § 119, the content of which in its entirety is herein incorporated by reference.

BACKGROUND

1. Field

Exemplary embodiments of the invention relate to a display device. More particularly, the exemplary embodiments of the invention relate to a two-way light emitting type display device.

2. Description of the Related Art

In general, a liquid crystal display ("LCD") includes a lower substrate, an upper substrate, and a liquid crystal layer having an anisotropic dielectric constant. The LCD controls an intensity of electric field applied to the liquid crystal layer to control a light transmittance of the liquid crystal layer, thereby displaying a desired image.

The LCD is widely used as a display device of a television set, a communication device such as a mobile phone, and a computer system, and displays the image only in one direction.

In recent years, responsive to a user's various needs, a two-way LCD that displays same or different images in different directions has been developed.

SUMMARY

Exemplary embodiments of the invention provide a display device which provides a light to display panels arranged on both sides using a single light emitting member.

Exemplary embodiments of the invention provide a display device including a first display panel including a display surface defined by a first direction and a second direction, a second display panel spaced apart from the first display panel in a third direction perpendicular to the display surface, and a backlight unit disposed between the first and second display panels to provide a light to the first and second display panels. The backlight unit includes a light emitting element, a first exit light guide plate including a first exit surface, a first reflective surface, and first side surfaces connecting the first exit surface and the first reflective surface, a second exit light guide plate spaced apart from the first exit light guide plate and including a second exit surface, a second reflective surface, and second side surfaces connecting the second exit surface and the second reflective surface, a first light-division light guide member including a first light-division exit surface facing a first connection side surface of the first side surfaces, a first light-division light incident surface receiving a light from the light emitting element, and first light-division connection surfaces connecting the first light-division light incident surface and the first light-division exit surface, and a second light-division light guide member including a second light-division exit surface facing a second connection side surface of the second side surfaces, a second light-division light incident surface receiving the light from the light emitting element, and second light-division connection surfaces connecting the second light-division light incident surface and the second light-division exit surface.

In an exemplary embodiment, the first exit light guide plate may be disposed closer to the first display panel than the second exit light guide plate is, and disposed farther from the second display panel than the second exit light guide plate is, and the first light-division exit surface may be disposed closer to the first display panel than the first light-division light incident surface is in the third direction.

In an exemplary embodiment, the second light-division exit surface may be disposed closer to the second display panel than the second light-division light incident surface is in the third direction.

In an exemplary embodiment, the first connection side surface and the second connection side surface may have a shape extending in the first direction and the first light-division light incident surface and the second light-division light incident surface are arranged in the first direction.

In an exemplary embodiment, each of the first light-division light incident surface and the second light-division light incident surface may be aligned on a reference surface defined by the first direction and the third direction.

In an exemplary embodiment, the first light-division light guide member may be provided in a plural number and the first light-division light guide members are spaced apart from each other in the first direction.

In an exemplary embodiment, the second light-division light guide member may be provided in a plural number and the second light-division light guide members are alternately arranged with the first light-division light guide members in the first direction.

In an exemplary embodiment, the light emitting element may include a plurality of first light emitting elements and a plurality of second light emitting elements, which are individually operated, the plurality of first light emitting elements emits a first light to the first light-division light guide members, and the plurality of second light emitting elements emits a second light to the second light-division light guide members.

In an exemplary embodiment, the first light emitted from the plurality of first light emitting elements may have a first brightness, and the second light emitted from the plurality of second light emitting elements has a second brightness higher than the first brightness.

In an exemplary embodiment, the first light-division light guide member may further include a first scattering layer disposed on the first light-division connection surfaces and the second light-division light guide member may further include a second scattering layer disposed on the second light-division connection surfaces.

In an exemplary embodiment, the first reflective surface may include a plurality of first light exit patterns and the second reflective surface may include a plurality of second light exit patterns.

In an exemplary embodiment, the display device may further include a reflective layer disposed between the first light exit patterns and the second light exit patterns.

In an exemplary embodiment, the backlight unit may further include a light blocking member, a first reflective layer disposed between the first light exit patterns and the light blocking member, and a second reflective layer disposed between the second light exit patterns and the light blocking member.

In an exemplary embodiment, the first light-division exit surface may have an area greater than an area of the first light-division light incident surface.

In an exemplary embodiment, the second light-division exit surface may have an area greater than an area of the second light-division light incident surface.

Exemplary embodiments of the invention provide a display device including a first display panel including a display surface defined by a first direction and a second direction, a second display panel spaced apart from the first display panel in a third direction of the display surface, and a backlight unit disposed between the first and second display panels to provide a light to each of the first and second display panels. The backlight unit includes a light emitting element, a first light guide plate including a first exit light guide member including a first exit surface, a first reflective surface, and first side surfaces connecting the first exit surface and the first reflective surface, a first light-division light incident surface receiving a light from the light emitting element, and a first light-division light guide member extending from the first light-division light incident surface and unitary with a first connection side surface of the first side surfaces, and a second light guide plate spaced apart from the first exit light guide plate in the third direction and including a second exit light guide member including a second exit surface, a second reflective surface, and second side surfaces connecting the second exit surface and the second reflective surface, a second light-division light incident surface receiving the light from the light emitting element, and a second light-division light guide member extending from the second light-division light incident surface and unitary with a second connection side surface of the second side surfaces.

In an exemplary embodiment, the first light-division light guide member may be provided in a plural number and extend from the first connection side surface, and the first light-division light guide members may be arranged in the first direction and spaced apart from each other.

In an exemplary embodiment, the second light-division light guide member may be provided in a plural number and extend from the second connection side surface, and the second light-division light guide members may be alternately arranged with the first light-division light guide members in the first direction.

In an exemplary embodiment, the light emitting element may include a plurality of first light emitting elements and a plurality of second light emitting elements, which are individually operated, the plurality of first light emitting elements may emit a first light to the first light-division light guide members, and the plurality of second light emitting elements may emit a second light to the second light-division light guide members.

In an exemplary embodiment, the backlight unit may further include a reflective layer disposed between the first light guide plate and the second light guide plate.

According to the above, the number of the components of the optical member is reduced, and thus a manufacturing cost of the display device is reduced.

BRIEF DESCRIPTION OF THE DRAWINGS

The above and other advantages of the invention will become readily apparent by reference to the following detailed description when considered in conjunction with the accompanying drawings wherein:

FIG. 11 is a cross-sectional view showing another exemplary embodiment of the display device shown in FIG. 1 according to the invention.

DETAILED DESCRIPTION

Figure 1:
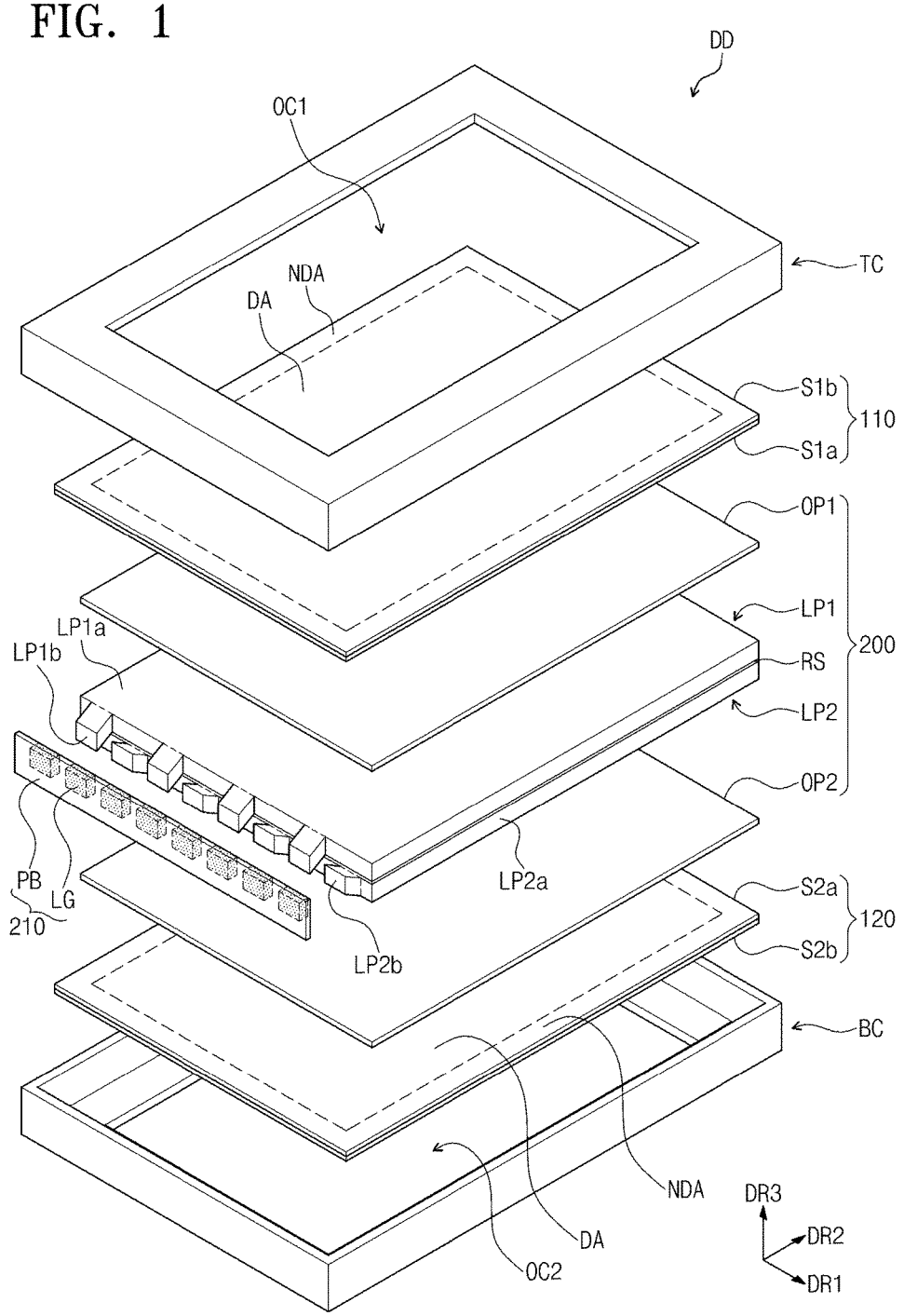
FIG. 1 is an exploded perspective view showing an exemplary embodiment of a display device according to the invention.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Like numbers refer to like elements throughout. As used herein, the term "and/or" includes any and all combinations of one or more of the associated listed items. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention. The terminology used herein is for the purpose of describing particular embodiments only and is not intended to be limiting of the invention. As used herein, the singular forms, "a", "an" and "the" are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be explained in detail with reference to the accompanying drawings.

Figure 2:
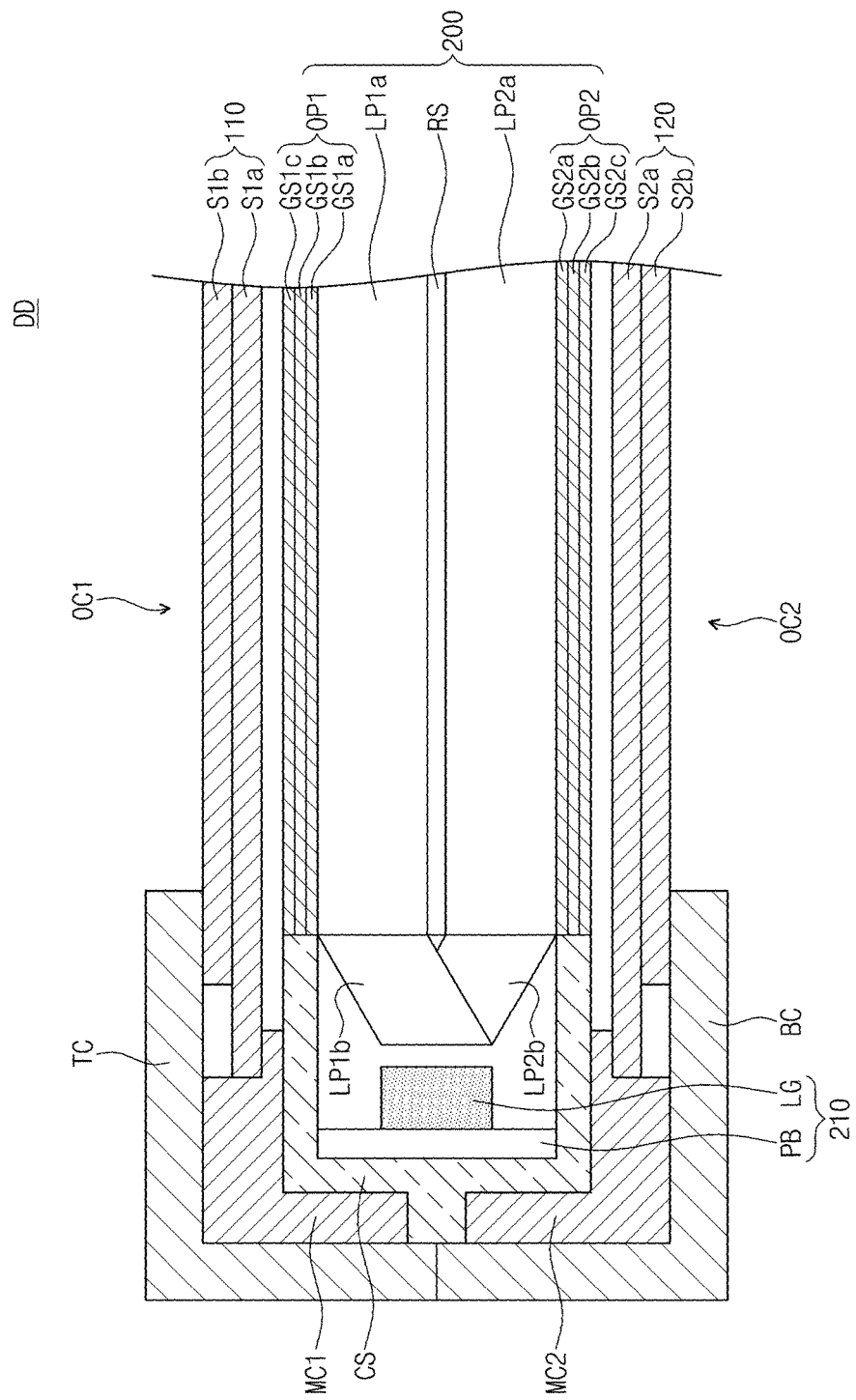
FIG. 2 is a cross-sectional view showing the display device shown in FIG. 1.

FIG. 1 is an exploded perspective view showing a display device DD according to an exemplary embodiment of the invention, and FIG. 2 is a cross-sectional view showing the display device DD shown in FIG. 1.

Referring to FIG. 1, the display device DD includes a first display panel 110, a second display panel 120, a backlight unit 200, a top chassis TC, and a bottom chassis BC.

The first display panel 110 is defined by a first direction DR1 and a second direction DR2 which is substantially perpendicular to the first direction DR1, and includes a display area DA in which an image displayed and a non-display area NDA on which components required to drive the first display panel 110 are disposed (e.g., mounted). The first display panel 110 receives a light provided from the backlight unit 200 and displays the image through the display area DA using the light.

The first display panel 110 includes a first substrate S1$a$ including a plurality of pixel electrodes (not shown), a second substrate S1$b$ including a common electrode (not shown) facing the pixel electrodes, and a liquid crystal layer (not shown) interposed between the first substrate S1$a$ and the second substrate S1$b$.

The second display panel 120 is spaced apart from the first display panel 110 in a third direction DR3 which is substantially perpendicular to both of the first direction DR1 and the second direction DR2. Hereinafter, the third direction DR3 may indicate one of opposite directions (e.g., upper and lower directions). Similarly, the second display panel 120 includes a display area DA in which an image displayed and a non-display area NDA on which components required to drive the second display panel 120 are mounted. The second display panel 120 receives a light provided from the backlight unit 200 and displays the image through the display area DA using the light.

The second display panel 120 includes a third substrate S2$a$ including a plurality of pixel electrodes (not shown), a fourth substrate S2$b$ including a common electrode (not shown) facing the pixel electrodes, and a liquid crystal layer (not shown) interposed between the third substrate S2$a$ and the fourth substrate S2$b$.

In an exemplary embodiment, each of the first and second display panels 110 and 120 may be, but not limited to, a liquid crystal display ("LCD") panel, for example.

The backlight unit 200 includes a first light guide plate LP1, a second light guide plate LP2, a reflective layer RS, a first optical sheet OP1, a second optical sheet OP2, and a light emitting member 210.

The backlight unit 200 is disposed between the first and second display panels 110 and 120 to provide the light to each of the first and second display panels 110 and 120. As a result, the display device DD may display the image through each of the first and second display panel 110 and 120.

The first light guide plate LP1 is disposed closer to the first display panel 110 than the second light guide plate LP2 is in the third direction DR3. The first light guide plate LP1 receives the light from the light emitting member 210 and transmits the light to the first display panel 110. In this case, the light exiting from the first light guide plate LP1 is provided to the first display panel 110 through the first optical sheet OP1. The first optical sheet OP1 is disposed between the first display panel 110 and the first light guide plate LP1 and controls an optical path of the light exiting from the first light guide plate LP1.

According to the illustrated exemplary embodiment, the first light guide plate LP1 includes a first exit light guide plate LP1*a* and a plurality of first light-division light guide members LP1*b* connected to one side surface of the first exit light guide plate LP1*a*. The first exit light guide plate LP1*a* and the first light-division light guide members LP1*b* may be unitary with each other, or may be provided as separate components. The first light-division light guide members LP1*b* receive the light from the light emitting member 210 and transmit the light to the first exit light guide plate LP1*a*.

The second light guide plate LP2 is closer to the second display panel 120 than the first light guide plate LP1 is in the third direction DR3. The second light guide plate LP2 receives the light from the light emitting member 210 and transmits the light to the second display panel 120. In this case, the light exiting from the second light guide plate LP2 is provided to the second display panel 120 through the second optical sheet OP2. The second optical sheet OP2 is disposed between the second display panel 120 and the second light guide plate LP2 and controls an optical path of the light exiting from the second light guide plate LP2.

According to the illustrated exemplary embodiment, the second light guide plate LP2 includes a second exit light guide plate LP2*a* and a plurality of second light-division light guide members LP2*b* connected to one side surface of the second exit light guide plate LP2*a*. The second exit light guide plate LP2*a* and the second light-division light guide members LP2*b* may be unitary with each other, or may be provided as separate components. The second light-division light guide members LP2*b* receive the light from the light emitting member 210 and transmit the light to the second exit light guide plate LP2*a*. The first and second light guide plates LP1 and LP2 will be described in detail with reference to FIGS. 3 to 6.

The first and second exit light guide plates LP1*a* and LP2*a* shown in FIG. 1 have a flat plate shape, but they should not be limited thereto or thereby. That is, the first and second exit light guide plates LP1 land LP2*a* may have a protrusion or a curved shape.

The reflective layer RS is disposed between the first light guide plate LP1 and the second light guide plate LP2. The reflective layer RS reflects the light provided from the first light guide plate LP1 to the first display panel 110 and the light provided from the second light guide plate LP2 to the second display panel 120. That is, the reflective layer RS may serve as a double-sided reflective layer.

The light emitting member 210 includes a light emitting element LG and a printed circuit board ("PCB") PB on which the light emitting element LG is mounted. The light emitting member 210 generates the light required to display the image and provides the light to one side surface of each of the first and second light guide plates LP1 and LP2.

According to the illustrated exemplary embodiment, the light emitting member 210 may be provided as a singular. That is, the display device DD according to the illustrated exemplary embodiment includes one light emitting member 210 rather than two light emitting members respectively corresponding to the first and second light guide plates LP1 and LP2. As a result, the light may be provided to the first and second light guide plates LP1 and LP2 using the single light emitting member 210. Accordingly, the number of components for the optical member is reduced, and thus a manufacturing cost of the display device DD is reduced.

Referring to FIG. 2, the bottom chassis BC and the top chassis TC are coupled to each other to provide an accommodating space in which the first display panel 110, the second display panel 120, and the backlight unit 200 are accommodated. According to the illustrated exemplary embodiment, the second display panel 120, the second optical member OP2, the second light guide plate LP2, the reflective layer RS, the first light guide plate LP1, the first optical sheet OP1, and the first display panel 110 are sequentially accommodated in the accommodating space along the third direction DR3 (refer to FIG. 1).

In addition, a first opening OC1 may be defined in the top chassis TC to display the image from the first display panel 110. A second opening OC2 may be defined in the bottom chassis BC to display the image from the second display panel 120. Although not shown in figures, the top chassis TC and the bottom chassis BC may be coupled to a glass member, for example.

A first mold frame MC1 has a stepped shape and is coupled to the top chassis TC. The first display panel 110 is disposed on the stepped shape of the first mold frame MC1 and partially covered by the top chassis TC. The second display panel 120 is disposed on a stepped portion of a second mold frame MC2 and partially covered by the bottom chassis BC.

A case CS is disposed between the first mold frame MC1 and the second mold frame MC2 and coupled to the first and second mold frames MC1 and MC2. The light emitting member 210 may be attached to an inner side of the case CS. In addition, the case CS may be coupled to the first and second optical sheets OP1 and OP2. Although not shown in figures, the case CS may have a stepped shape on which the first and second optical sheets OP1 and OP2 are disposed.

The first optical sheet OP1 includes first to third sub-optical sheets GS1*a* to GS1*c* disposed between the first display panel 110 and the first light guide plate LP1 to control the optical path of the light. The second optical sheet OP2 includes fourth to sixth sub-optical sheets GS2*a* to GS2*c* disposed between the second display panel 120 and the second light guide plate LP2 to control the optical path of the light.

As an example, the first to sixth sub-optical sheets GS1*a* to GS1*c* and GS2*a* to GS2*c* may serve as upper/lower diffusion sheets and prism sheets, but they should not be limited thereto or thereby.

In addition, the structures of the bottom chassis BC, the top chassis TC, the first and second mold frames MC1 and MC2, and the case CS should not be limited to those shown in FIG. 2. That is, the top chassis TC, the first and second mold frames MC1 and MC2, and the case CS may have various other shapes.

Figure 3:
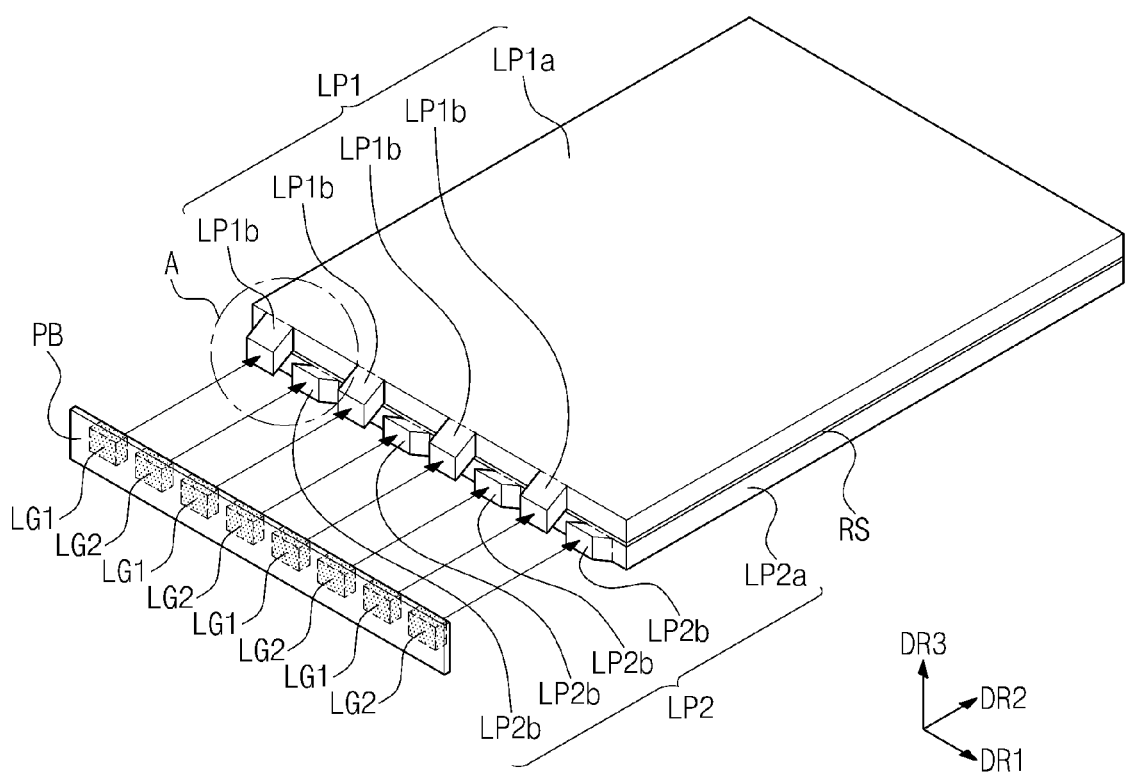
FIG. 3 is a perspective view showing an exemplary embodiment of an arrangement of a first light guide plate, a second light guide plate, and a backlight unit according to the invention.
Figure 4:
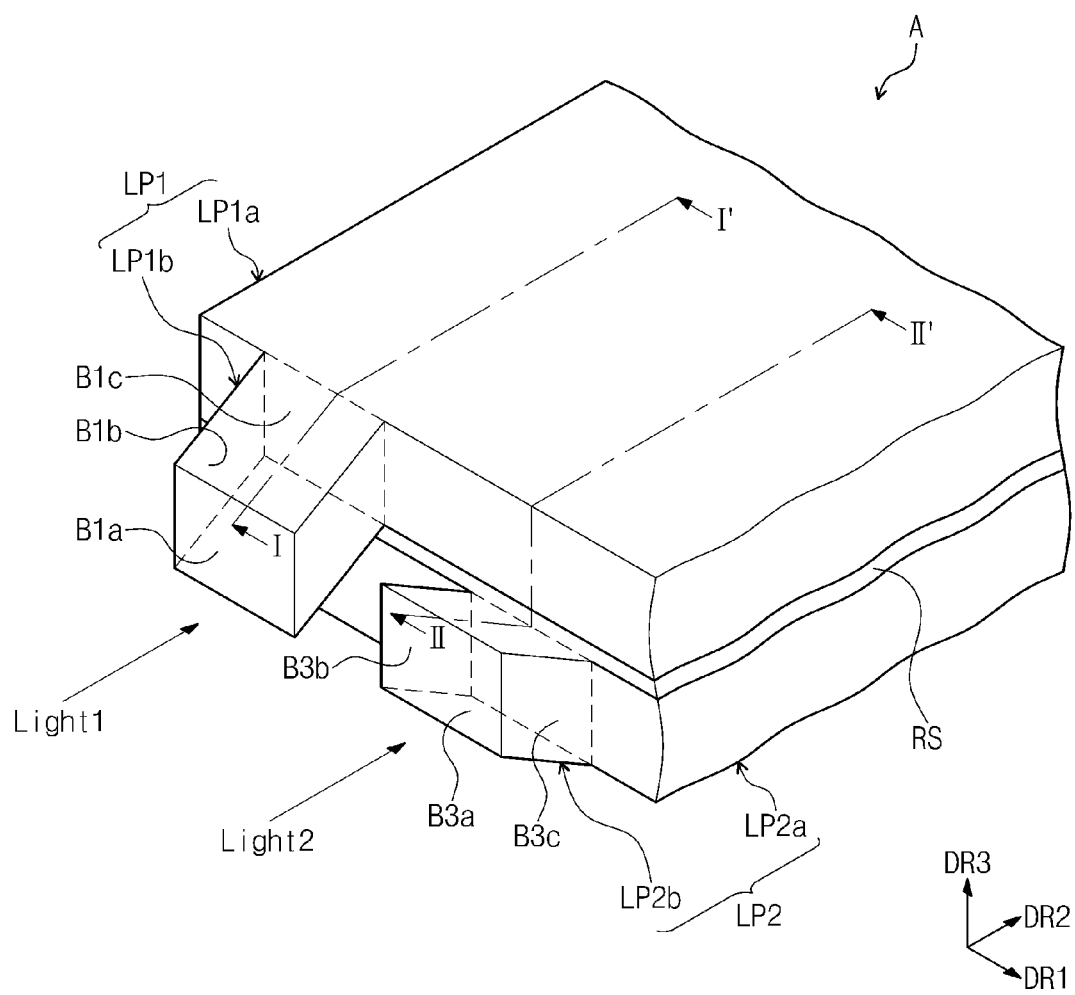
FIG. 4 is a partially enlarged perspective view showing a portion A shown in FIG. 3.

FIG. 3 is a perspective view showing an arrangement of a first exit light guide plate, a second exit light guide plate, and a backlight unit according to an exemplary embodiment of the invention and FIG. 4 is a partially enlarged perspective view showing a portion A shown in FIG. 3.

Referring to FIGS. 3 and 4, the light emitting element LG mounted on the PCB PB includes a plurality of first light emitting elements LG1 and a plurality of second light emitting elements LG2. The first light emitting elements LG1 are alternately arranged with the second light emitting elements LG2 in the first direction DR1 and disposed on the PCB PB.

The first light guide plate LP1 includes the first exit light guide plate LP1a and the first light-division light guide members LP1b. The second light guide plate LP2 is spaced apart from the first light guide plate LP1 in the third direction DR3 and includes the second exit light guide plate LP2a and the second light-division light guide members LP2b.

According to the illustrated exemplary embodiment, the first exit light guide plate LP1a and the first light-division light guide members LP1b may be separated from each other. Similarly, the second exit light guide plate LP2a and the second light-division light guide members LP2b may be separated from each other.

The first light-division light emitting members LP1b are connected to the one side surface of the first exit light guide plate LP1a, arranged in the first direction DR1 and spaced apart from each other.

In detail, as shown in FIG. 4, the first exit light guide plate LP1a includes a first exit surface from which a first light Light1 exits to the first display panel 110 and a first reflective surface facing the first exit surface. The first reflective surface may face one surface of the reflective layer RS. In addition, the first exit light guide plate LP1a includes a plurality of first side surfaces connecting the first exit surface and the first reflective surface. In an exemplary embodiment, the first light Light1 may be, but not limited to, the light emitted from the first light emitting element LG1.

Each of the first light-division light guide members LP1b includes a first light-division light incident surface B1a, first light-division connection surfaces B1b, and a first light-division exit surface B1c. The first light-division connection surfaces B1b may be side surfaces to connect the first light-division light incident surface B1a and the first light-division exit surface B1c.

The first light-division light incident surface B1a is disposed to face the first light emitting element LG1 and the first light-division exit surface B1c is connected to one side surface of the first exit light guide plate LP1a. The first light emitting element LG1 emits the first light Light1 to the first light-division light incident surface B1a.

As a result, the first light Light1 incident to the first light-division light incident surface B1a is provided to the first light-division exit surface B1c through the first light-division connection surfaces B1b. Therefore, the first light Light1 incident to the first light-division exit surface B1c is provided to the first exit light guide plate LP1a and provided to the first display panel 110 through the first exit surface of the first exit light guide plate LP1a.

In addition, the first light-division exit surface B1c according to the illustrated exemplary embodiment is disposed closer to the first display panel 110 than the first light-division light incident surface B1a is in the third direction DR3.

The second light-division light guide members LP2b are connected to the one side surface of the second exit light guide plate LP2a and alternately arranged with the first light-division light guide members LP1b in the first direction DR1. That is, the second light-division light guide members Lp2b may be disposed between the first light-division light guide members LP1b.

In detail, as shown in FIG. 4, the second exit light guide plate LP2a includes a second exit surface from which a second light Light2 exits to the second display panel 120 and a second reflective surface facing the second exit surface. The second reflective surface may face the other surface of the reflective layer RS. In addition, the second exit light guide plate LP2a includes a plurality of second side surfaces connecting the second exit surface and the second reflective surface. In an exemplary embodiment, the second light Light2 may be, but not limited to, the light emitted from the second light emitting element LG2.

Each of the second light-division light guide members LP2b includes a second light-division light incident surface B3a, second light-division connection surfaces B3b, and a second light-division exit surface B3c. The second light-division connection surfaces B3b may be side surfaces to connect the second light-division light incident surface B3a and the second light-division exit surface B3c.

The second light-division light incident surface B3a is disposed to face the second light emitting element LG2 and the second light-division exit surface B3c is connected to one side surface of the second exit light guide plate LP2a. The second light emitting element LG2 emits the second light Light2 to the second light-division light incident surface B3a.

As a result, the second light Light2 incident to the second light-division light incident surface B3a is provided to the second light-division exit surface B3c through the second light-division connection surfaces B3b. Thus, the second light Light2 incident to the second light-division exit surface B3c is provided to the second exit light guide plate LP2a and provided to the second display panel 120 through the second exit surface of the second exit light guide plate LP2a.

In addition, the second light-division exit surface B3c according to the illustrated exemplary embodiment is disposed closer to the second display panel 120 than the second light-division light incident surface B3a is in the third direction DR3.

According to the illustrated exemplary embodiment, the first light-division light incident surface B1a and the second light-division light incident surface B3a are arranged in the first direction DR1. That is, the first light-division light incident surface B1a and the second light-division light incident surface B3a are aligned on a reference surface defined by the first and third directions DR1 and DR3.

According to the illustrated exemplary embodiment, the first and second light-division light incident surfaces B1a and B3a have a substantially quadrangular shape, for example, but they should not be limited thereto or thereby. That is, the first and second light-division light incident surfaces B1a and B3a may have various other polygonal shapes.

Referring back to FIG. 3, the first and second light emitting elements LG1 and LG2 may be individually operated. In an exemplary embodiment, in the case where the image displayed only in the first display panel 110 (refer to FIGS. 1 and 2), the light is emitted from only the first light emitting elements LG1, for example. In addition, in the case where the image is displayed only in the second display panel 120 (refer to FIGS. 1 and 2), the light is emitted from only the second light emitting elements LG2. Further, in the case where the image is displayed in the first and second display panels 110 and 120, the light is emitted from the first and second light emitting elements LG1 and LG2.

In general, a brightness of the display device DD (refer to FIGS. 1 and 2) installed in an indoor place may be differently set from a brightness of the display device DD installed in an outdoor place. In an exemplary embodiment, the brightness in the outdoor place is higher than the brightness in the indoor place, and thus the display device installed in the outdoor place has relatively higher brightness than that of the display device installed in the indoor place.

According to the exemplary embodiment, the first light emitting elements LG1 emit the light having brightness different from the brightness of the light emitted from the second light emitting elements LG2. In an exemplary embodiment, the light emitted from the first light emitting elements LG1 has the brightness higher than the brightness of the light emitted from the second light emitting elements LG2, for example. As a result, the brightness of the light provided to the first display panel 110 may be different from the brightness of the light provided to the second display panel 120.

Accordingly, one of the first and second display panels 110 and 120 having different brightnesses may be selectively used according to the ambient environment.

In the illustrated exemplary embodiment, the first and second light emitting elements LG1 and LG2 have different brightnesses, but they should not be limited thereto or thereby. That is, the first and second light emitting elements LG1 and LG2 may emit the light at the same brightness.

Figure 5A:
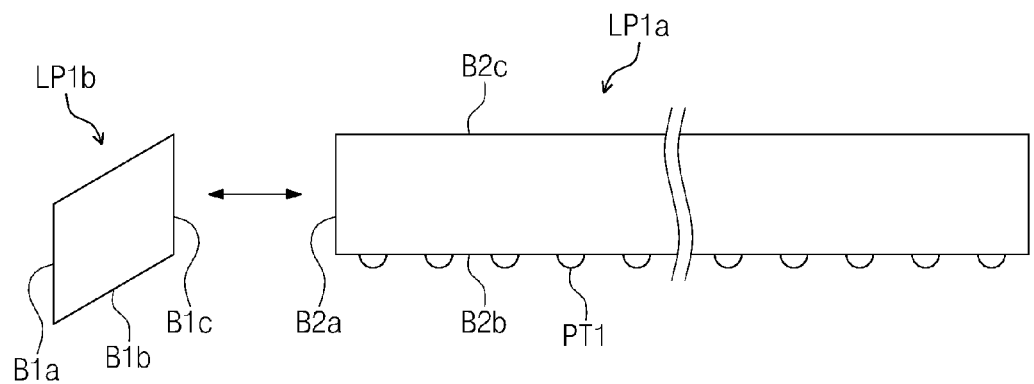
FIGS. 5A and 5B are cross-sectional views respectively showing an exemplary embodiment of a first light guide plate and a second light guide plate according to the invention.
Figure 5B:
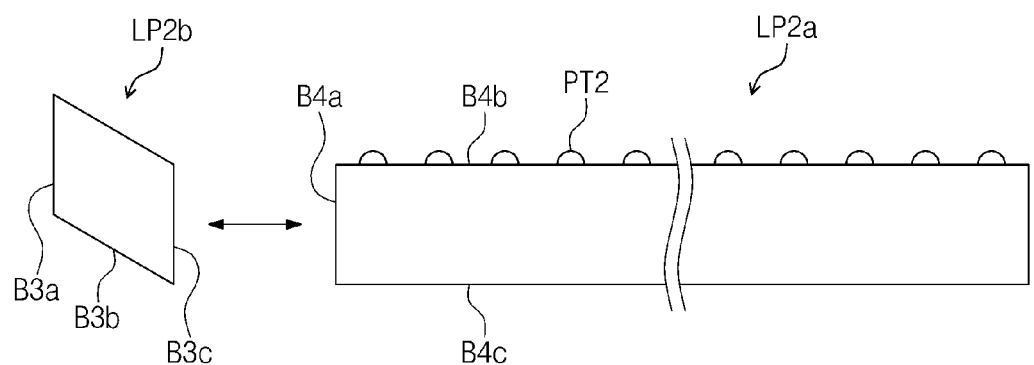

FIGS. 5A and 5B are cross-sectional views respectively showing the first light guide plate LP1 and the second light guide plate LP2 according to an exemplary embodiment of the invention.

Referring to FIGS. 5A and 5B, the first light guide plate LP1 includes the first exit light guide plate LP1*a* and the first light-division light guide member LP1*b*, which are separable from each other. The second light guide plate LP2 includes the second exit light guide plate LP2*a* and the second light-division light guide member LP2*b*, which are separable from each other.

In detail, the first exit light guide plate LP1 *a* includes a first side surface B2*a*, a first reflective surface B2*b*, and a first exit surface B2*c*. The first light-division exit surface B1*c* of the first light-division light guide member LP1*b* may be connected to or separated from the first side surface B2*a*.

According to the illustrated exemplary embodiment, the first reflective surface B2*b* facing the one surface of the reflective layer RS (refer to FIG. 3) includes a plurality of first light exit patterns PT1. The first light exit patterns PT1 control an optical path of the light incident through the first side surface B2*a*. As an example, the first light exit patterns PT1 transfer the light incident through the first side surface B2*a* to the first exit surface B2*c*. Therefore, the light may be provided to the first display panel 110 (refer to FIG. 1).

The second exit light guide plate LP2*a* includes a second side surface B4*a*, a second reflective surface B4*b*, and a second exit surface B4*c*. The second light-division exit surface B3*c* of the second light-division light guide member LP2*b* may be connected to or separated from the second side surface B4*a*.

According to the illustrated exemplary embodiment, the second reflective surface B4*b* facing the other surface of the reflective layer RS includes a plurality of second light exit patterns PT2. The second light exit patterns PT2 control an optical path of the light incident through the second side surface B4*a*. As an example, the second light exit patterns PT2 transfer the light incident through the second side surface B4*a* to the second exit surface B4*c*. Thus, the light may be provided to the second display panel 120 (refer to FIG. 1).

As shown in FIGS. 5A and 5B, the first and second light exit patterns PT1 and PT2 have a substantially semi-circular shape, but they should not be limited thereto or thereby. That is, each light exit pattern may have various other shapes, such as a triangular shape, a quadrangular shape, a trapezoidal shape, etc. In an exemplary embodiment, each of the first and second reflective surfaces B2*b* and B4*b* may include light exit patterns in accordance with an intaglio shape in which a predetermined recess is defined, for example.

Figure 6A:
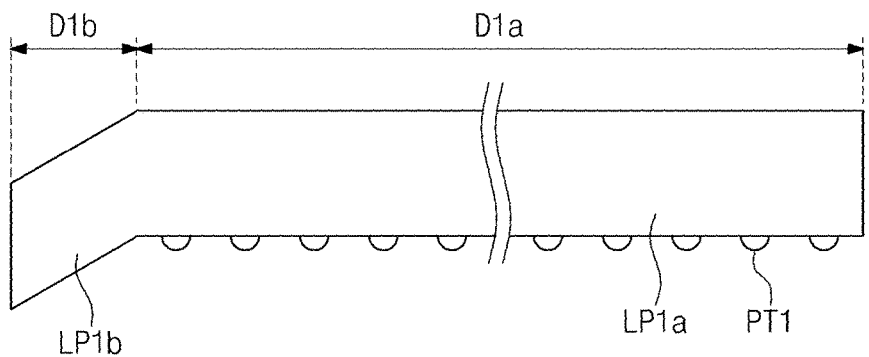
FIGS. 6A and 6B are cross-sectional views respectively showing another exemplary embodiment of a first light guide plate and a second light guide plate according to the invention.
Figure 6B:
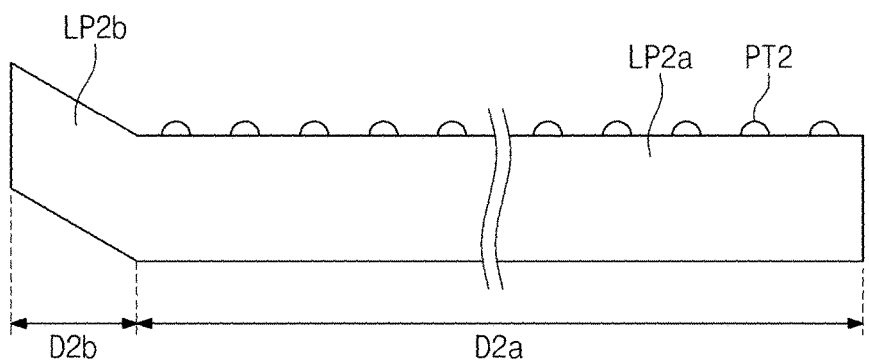

FIGS. 6A and 6B are cross-sectional views respectively showing a first light guide plate LP1 and a second light guide plate LP2 according to another exemplary embodiment of the invention.

Referring to FIGS. 6A and 6B, the first light guide plate LP1 shown in FIG. 3 includes a first exit light guide plate LP1*a* corresponding to a first light guide area D1*a* and a first light-division light guide member LP1*b* extending from the first exit light guide plate LP1*a* and corresponding to a second light guide area D1*b*. The second light guide plate LP2 shown in FIG. 3 includes a second exit light guide plate LP2*a* corresponding to a third light guide area D2*a* and a second light-division light guide member LP2*b* extending from the second exit light guide plate LP2*a* and corresponding to a fourth light guide area D2*b*.

According to the illustrated exemplary embodiment, the first light-division light guide member LP1*b* may be unitary with a first connection side surface among first side surfaces of the first exit light guide plate LP1*a*. The second light-division light guide member LP2*b* may be unitary with a second connection side surface among second side surfaces of the second exit light guide plate LP2*a*.

Figure 7A:
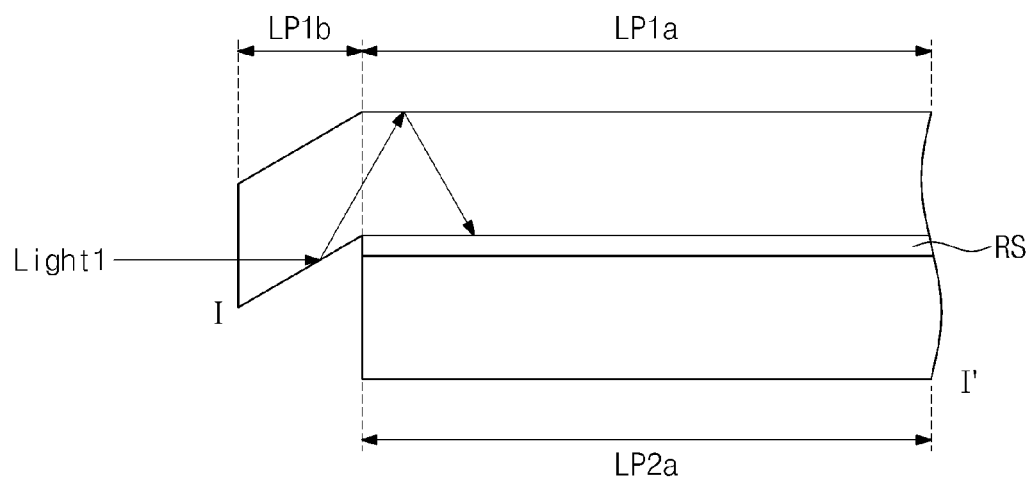
FIG. 7A is a cross-sectional view of an exemplary embodiment taken along line I-I' shown in FIG. 4 according to the invention.
Figure 7B:
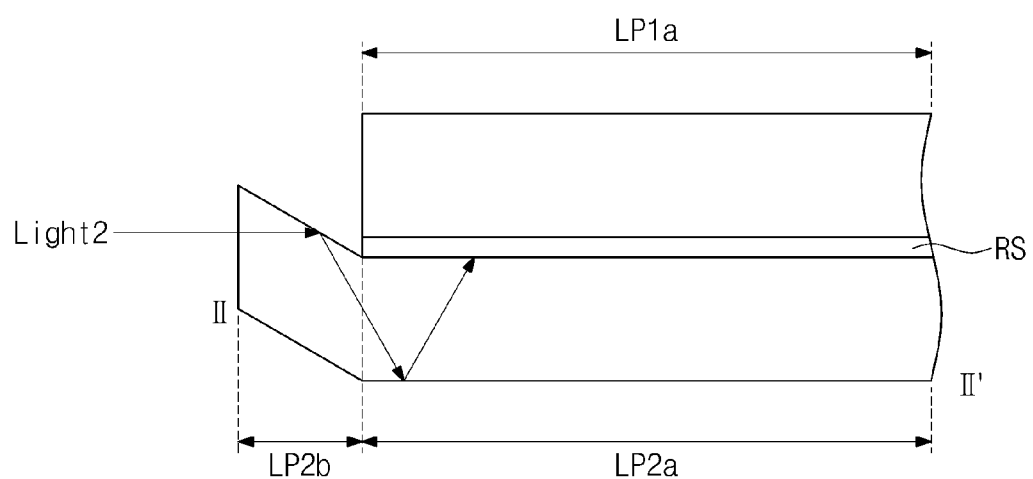
FIG. 7B is a cross-sectional view of an exemplary embodiment taken along line II-II' shown in FIG. 4 according to an exemplary embodiment of the invention.

FIG. 7A is a cross-sectional view taken along line I-I' shown in FIG. 4 according to an exemplary embodiment of the invention and FIG. 7B is a cross-sectional view taken along line II-II' shown in FIG. 4 according to an exemplary embodiment of the invention.

Referring to FIGS. 4 and 7A, the first light-division exit surface B1*c* is disposed closer to the first display panel 110 than the first light-division light incident surface B1*a* is in the third direction DR3. Accordingly, the first light Light1 incident to the first light-division light incident surface B1*a* is totally reflected by the first light-division connection surfaces B1*b* and incident to the first light-division exit surface B1*c*.

In this case, since the first light Light1 incident to the first light-division light incident surface B1*a* is totally reflected by the first light-division connection surfaces B1*b*, the first light Light1 may not be incident to the second light guide plate LP2. Therefore, in the case where only the first display panel 110 of the first and second display panels 110 and 120 is operated, the light may not leak to the second display panel 120.

Referring to FIGS. 4 and 7B, the second light-division exit surface B3*c* is disposed closer to the second display panel 120 than the second light-division light incident surface B3*a* is in the third direction DR3. Accordingly, the second light Light2 incident to the second light-division light incident surface B3*a* is totally reflected by the second light-division connection surfaces B3*b* and incident to the second light-division exit surface B3*c*.

In this case, since the second light Light2 incident to the second light-division light incident surface B3*a* is totally reflected by the second light-division connection surfaces B3*b*, the second light Light2 may not be incident to the first light guide plate LP1. Thus, in the case where only the second display panel 120 of the first and second display panels 110 and 120 is operated, the light may not leak to the first display panel 110.

Figure 8A:
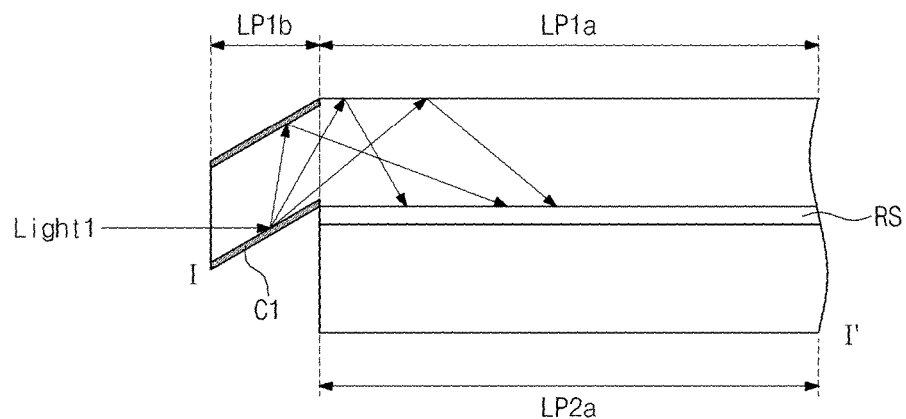
FIG. 8A is a cross-sectional view of another exemplary embodiment taken along line I-I' shown in FIG. 4 according to the invention.
Figure 8B:
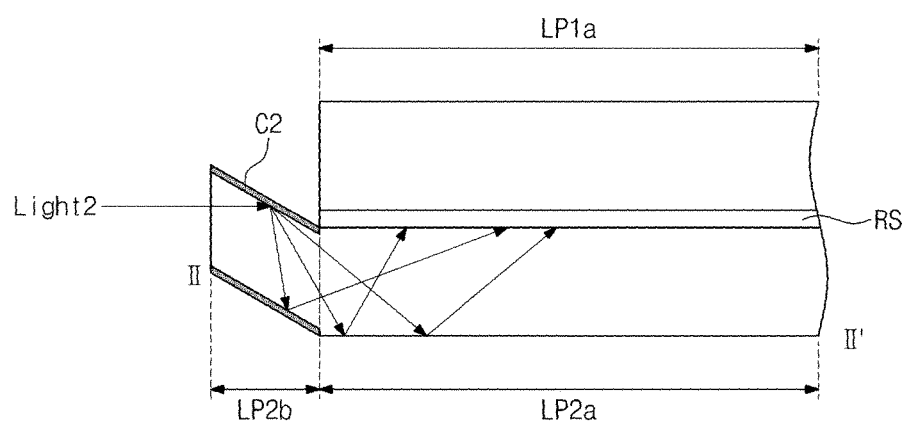
FIG. 8B is a cross-sectional view of another exemplary embodiment taken along line II-II' shown in FIG. 4 according to the invention.

FIG. 8A is a cross-sectional view taken along line I-I' shown in FIG. 4 according to another exemplary embodiment of the invention and FIG. 8B is a cross-sectional view taken along line II-II' shown in FIG. 4 according to another exemplary embodiment of the invention.

Light guide plates shown in FIGS. 8A and 8B may have the same structure and function as those of the light guide plates shown in FIGS. 7A and 7B except for a scattering layer included in the first and second light-division light guide members LP1b and LP2b.

Referring to FIGS. 4 and 8A, the first light-division light guide member LP1b may further include a first scattering layer C1 disposed on the first light-division connection surfaces B1b. The first light Light1 incident to the first light-division light incident surface B1a is scattered by the first light-division connection surfaces B1b. As a result, the optical path of the first light Light1 incident to the first light-division exit surface B1c may be diversified.

Referring to FIGS. 4 and 8B, the second light-division light guide member LP2b may further include a second scattering layer C2 disposed on the second light-division connection surfaces B3b. The second light Light2 incident to the second light-division light incident surface B3a is scattered by the second light-division connection surfaces B3b. As a result, the optical path of the second light Light2 incident to the second light-division exit surface B3c may be diversified.

In an exemplary embodiment, the first and second scattering layers C1 and C2 may include titanium dioxide (TiO2), for example, but they should not be limited thereto or thereby.

Figure 9:
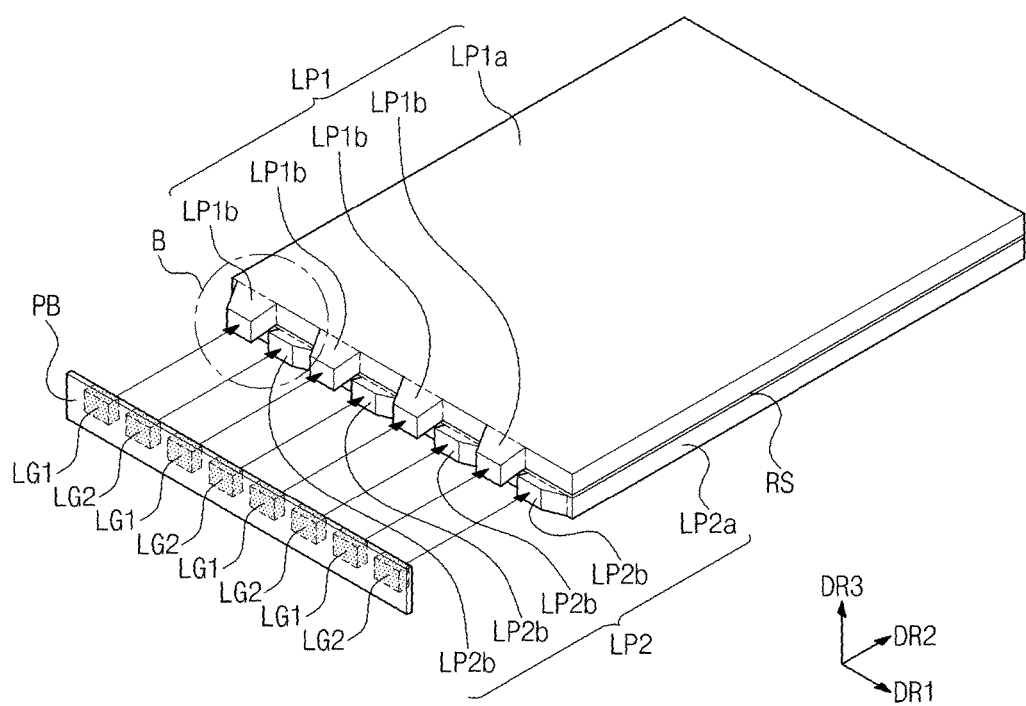
FIG. 9 is a perspective view showing another exemplary embodiment of an arrangement of a first light guide plate, a second light guide plate, and a backlight unit according to the invention.
Figure 10:
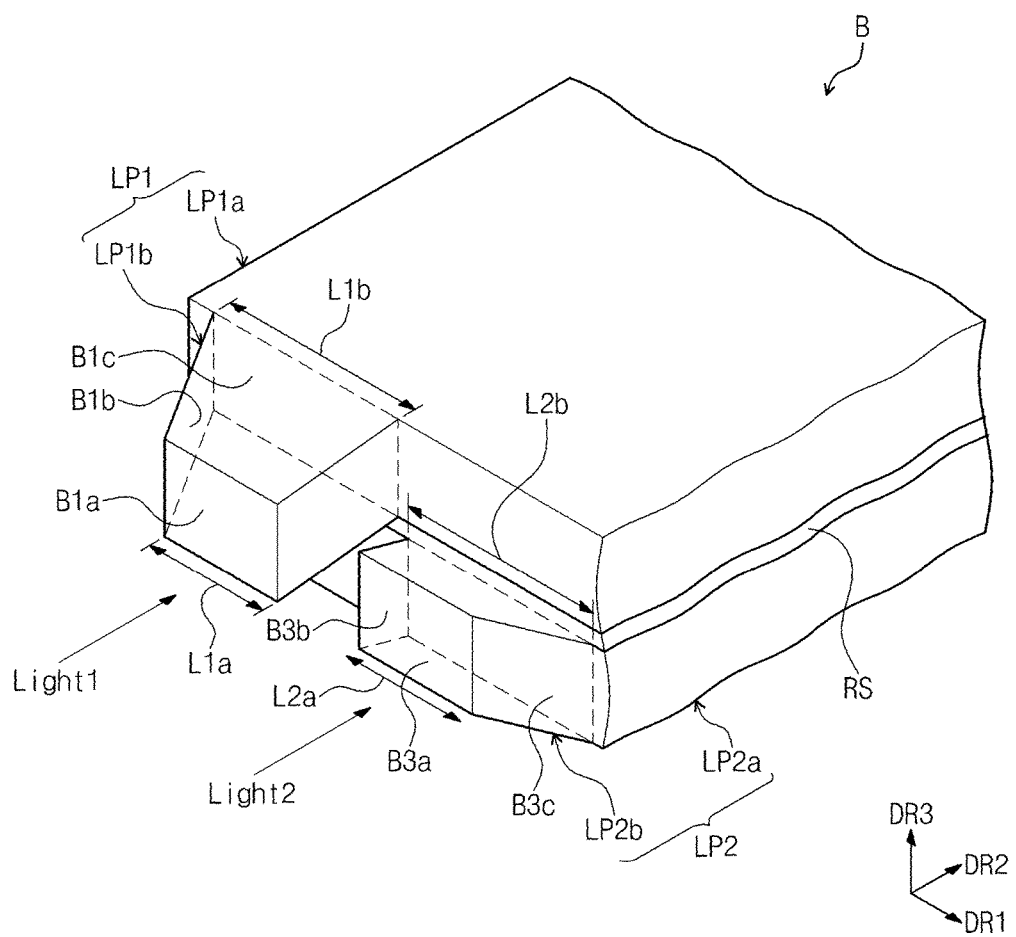
FIG. 10 is a partially enlarged perspective view showing a portion B shown in FIG. 9.

FIG. 9 is a perspective view showing an arrangement of a first exit light guide plate, a second exit light guide plate, and a backlight unit according to another exemplary embodiment of the invention and FIG. 10 is a partially enlarged perspective view showing a portion B shown in FIG. 9.

The first and second light guide plates LP1 and LP2 shown in FIGS. 9 and 10 may have the same structure and function as those of the first and second light guide plates LP1 and LP2 shown in FIG. 4 except for structures of first and second light-division light guide members LP1b and LP2b. Accordingly, the first and second light-division light guide members LP1b and LP2b will be described in detail with reference to FIG. 9.

Referring to FIGS. 9 and 10, the first light-division light guide members LP1b are connected to one side surface of the first exit light guide plate LP1a and spaced apart from each other.

In detail, the first exit light guide plate LP1a includes a first exit surface from which the first light Light1 exits to the first display panel 110 and a first reflective surface facing the first exit surface. The first exit light guide plate LP1a includes a plurality of first side surfaces connecting the first exit surface and the first reflective surface.

Each of the first light-division light guide members LP1b includes a first light-division light incident surface B1a, first light-division connection surfaces B1b, and a first light-division exit surface B1c. The first light-division connection surfaces B1b may be side surfaces connecting the first light-division light incident surface B1a and the first light-division light exit surface B1c.

According to the exemplary embodiment, the first light-division light incident surface B1a has a first width L1a in the first direction DR1. The first light-division exit surface B1c has a second width L1b in the first direction DR1. That is, the first light-division exit surface B1c is longer than the first light-division light incident surface B1a in the first direction DR1. Therefore, the first light-division exit surface B1c has an area greater than that of the first light-division light incident surface B1a.

As a result, the first light Light1 totally reflected by the first light-division connection surfaces B1b may be incident to the first side surface of the first exit light guide plate LP1a, which is connected to the first light-division exit surface B1c, at various angles. Thus, the light may be more widely output along the first direction DR1 of the first exit surface.

Similarly, the second exit light guide plate LP2a includes a second exit surface from which the second light Light2 exits to the second display panel 120 and a second reflective surface facing the second exit surface. The second exit light guide plate LP2a includes a plurality of second side surfaces connecting the second exit surface and the second reflective surface.

Each of the second light-division light guide members LP2b includes a second light-division light incident surface B3a, second light-division connection surfaces B3b, and a second light-division exit surface B3c. The second light-division connection surfaces B3b may be side surfaces connecting the second light-division light incident surface B3a and the second light-division light exit surface B3c.

According to the exemplary embodiment, the second light-division light incident surface B3a has a third width L2a in the first direction DR1. The second light-division exit surface B3c has a fourth width L2b in the first direction DR1. That is, the second light-division exit surface B3c is longer than the second light-division light incident surface B3a in the first direction DR1. Therefore, the second light-division exit surface B3c has an area greater than that of the second light-division light incident surface B3a.

As a result, the second light Light2 totally reflected by the second light-division connection surfaces B3b may be incident to the second side surface of the second exit light guide plate LP2a connected to the second light-division exit surface B3c at various angles. Thus, the light may be more widely output along the first direction DR1 of the second exit surface.

As described above, the first light-division light guide members LP1b and the second light-division light guide members LP2b according to the illustrated exemplary embodiment may have various shapes and connected to the first and second exit light guide plates LP1a and LP2a.

FIG. 11 is a cross-sectional view showing a display device DD2 according to another exemplary embodiment of the invention.

The display device DD2 shown in FIG. 11 may have the same structure and function as those of the display device DD shown in FIG. 2 except for a first reflective layer RS1, a second reflective layer RS2, and a light blocking member CT. Accordingly, the first reflective layer RS1, the second reflective layer RS2, and the light blocking member CT will be mainly described with reference to FIG. 11.

The display device DD2 shown in FIG. 11 includes two reflective layers, e.g., the first and second reflective layers RS1 and RS2, to correspond to the number of the first and second light guide plates LP1 (refer to FIG. 10) and LP2 (refer to FIG. 10) when compared with the display device DD shown in FIG. 2.

In detail, the light blocking member CT is disposed between the first light guide plate LP1 and the second light guide plate LP2. The first reflective layer RS1 is disposed between the first light guide plate LP1 and the light blocking member CT. The first reflective layer RS1 reflects the light provided from the first light guide plate LP1 to travel to the first display panel 110.

The second reflective layer RS2 is disposed between the second light guide plate LP2 and the light blocking member CT. The second reflective layer RS2 reflects the light provided from the second light guide plate LP2 to travel to the second display panel 120.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a first display panel comprising a display surface defined by a first direction and a second direction;
a second display panel spaced apart from the first display panel in a third direction perpendicular to the display surface; and
a backlight unit which is disposed between the first and second display panels and provides a light to the first and second display panels, the backlight unit comprising:
a light emitting element which emits a light;
a first exit light guide plate comprising a first exit surface, a first reflective surface, and first side surfaces connecting the first exit surface and the first reflective surface;
a second exit light guide plate spaced apart from the first exit light guide plate and comprising a second exit surface, a second reflective surface, and second side surfaces connecting the second exit surface and the second reflective surface;
a first light-division light guide member comprising a first light-division exit surface facing a first connection side surface of the first side surfaces, a first light-division light incident surface which receives the light from the light emitting element, and first light-division connection surfaces connecting the first light-division light incident surface and the first light-division exit surface; and
a second light-division light guide member comprising a second light-division exit surface facing a second connection side surface of the second side surfaces, a second light-division light incident surface which receives the light from the light emitting element, and second light-division connection surfaces connecting the second light-division light incident surface and the second light-division exit surface,
wherein the light emitting element is disposed on only a same single side defining each of the first and second light-division light guide members, and
wherein each of the first light-division light incident surface and the second light-division light incident surface is aligned to be co-linear in the first direction on a reference surface defined by the first direction and the third direction.

2. The display device of claim 1, wherein the first exit light guide plate is disposed closer to the first display panel than the second exit light guide plate is, and disposed farther from the second display panel than the second exit light guide plate is, and the first light-division exit surface is disposed closer to the first display panel than the first light-division light incident surface is in the third direction.

3. The display device of claim 2, wherein the second light-division exit surface is disposed closer to the second display panel than the second light-division light incident surface is in the third direction.

4. The display device of claim 1, wherein the first connection side surface and the second connection side surface have a shape extending in the first direction, and the first light-division light incident surface and the second light-division light incident surface are arranged in the first direction.

5. The display device of claim 4, wherein the first light-division light guide member is provided in a plural number and the first light-division light guide members are spaced apart from each other in the first direction.

6. The display device of claim 5, wherein the second light-division light guide member is provided in a plural number and the second light-division light guide members are alternately arranged with the first light-division light guide members in the first direction.

7. The display device of claim 6, wherein the light emitting element comprises a plurality of first light emitting elements and a plurality of second light emitting elements, which are individually operated, the plurality of first light emitting elements emits a first light to the first light-division light guide members, and the plurality of second light emitting elements emits a second light to the second light-division light guide members.

8. The display device of claim 7, wherein the first light emitted from the plurality of first light emitting elements has a first brightness and the second light emitted from the plurality of second light emitting elements has a second brightness higher than the first brightness.

9. The display device of claim 1, wherein the first light-division light guide member further comprises a first scattering layer disposed on the first light-division connection surfaces and the second light-division light guide member further comprises a second scattering layer disposed on the second light-division connection surfaces.

10. The display device of claim 1, wherein the first reflective surface comprises a plurality of first light exit patterns and the second reflective surface comprises a plurality of second light exit patterns.

11. The display device of claim 10, further comprising a reflective layer disposed between the plurality of first light exit patterns and the plurality of second light exit patterns.

12. The display device of claim 10, wherein the backlight unit further comprises:
a light blocking member;
a first reflective layer disposed between the plurality of first light exit patterns and the light blocking member; and
a second reflective layer disposed between the plurality of second light exit patterns and the light blocking member.

13. The display device of claim 1, wherein the first light-division exit surface has an area greater than an area of the first light-division light incident surface.

14. The display device of claim 1, wherein the second light-division exit surface has an area greater than an area of the second light-division light incident surface.

15. A display device comprising:
a first display panel comprising a display surface defined by a first direction and a second direction;
a second display panel spaced apart from the first display panel in a third direction perpendicular to the display surface; and a backlight unit which is disposed between the first and second display panels and provides a light to each of the first and second display panels, the backlight unit comprising:

a light emitting element which emits a light;

a first light guide plate comprising a first exit light guide member comprising a first exit surface, a first reflective surface, and first side surfaces connecting the first exit surface and the first reflective surface, a first light-division light incident surface which receives the light from the light emitting element, and a first light-division light guide member extending from the first light-division light incident surface and unitary with a first connection side surface of the first side surfaces; and a second light guide plate spaced apart from the first exit light guide plate in the third direction and comprising a second exit light guide member comprising a second exit surface, a second reflective surface, and second side surfaces connecting the second exit surface and the second reflective surface, a second light-division light incident surface which receives the light from the light emitting element, and a second light-division light guide member extending from the second light-division light incident surface and unitary with a second connection side surface of the second side surfaces, wherein the light emitting element is disposed on only a same single side defining each of the first and second guide plates, and wherein each of the first light-division light incident surface and the second light-division light incident surface is aligned to be co-linear in the first direction on a reference surface defined by the first direction and the third direction.

16. The display device of claim 15, wherein the first light-division light guide member is provided in a plural number and extends from the first connection side surface, and the first light-division light guide members are arranged in the first direction and spaced apart from each other.

17. The display device of claim 16, wherein the second light-division light guide member is provided in a plural number and extends from the second connection side surface, and the second light-division light guide members are alternately arranged with the first light-division light guide members in the first direction.

18. The display device of claim 17, wherein the light emitting element comprises a plurality of first light emitting elements and a plurality of second light emitting elements, which are individually operated, the plurality of first light emitting elements emits a first light to the first light-division light guide members, and the plurality of second light emitting elements emits a second light to the second light-division light guide members.

19. The display device of claim 15, wherein the backlight unit further comprises a reflective layer disposed between the first light guide plate and the second light guide plate.

* * * * *